(12) United States Patent
Keen et al.

(10) Patent No.: US 6,988,670 B2
(45) Date of Patent: Jan. 24, 2006

(54) HEATING/VENTILATING/AIR CONDITIONING SYSTEMS FOR VEHICLES

(75) Inventors: Paul A. Keen, Victoria (AU); Anthony A. Laul, Victoria (AU)

(73) Assignee: Air International Pty Ltd, Port Melbourne (AU)

( * ) Notice: Subject to any disclaimer, the term of this patent is extended or adjusted under 35 U.S.C. 154(b) by 0 days.

(21) Appl. No.: 10/204,245

(22) PCT Filed: Feb. 21, 2001

(86) PCT No.: PCT/AU01/00174

§ 371 (c)(1),
(2), (4) Date: Jun. 9, 2003

(87) PCT Pub. No.: WO01/62529

PCT Pub. Date: Aug. 30, 2001

(65) Prior Publication Data

US 2004/0026522 A1 Feb. 12, 2004

(30) Foreign Application Priority Data

Feb. 21, 2000 (AU) .................................. PQ5750

(51) Int. Cl.
*F24F 11/00* (2006.01)
(52) U.S. Cl. ............... 236/49.3; 236/91 C; 62/179; 165/43; 454/75
(58) Field of Classification Search .............. 236/49.1, 236/49.3, 91 C, 49.5; 62/179, 186, 176.1; 165/42, 43; 454/75
See application file for complete search history.

(56) References Cited

U.S. PATENT DOCUMENTS

| | | | | |
|---|---|---|---|---|
| 4,811,897 A | * | 3/1989 | Kobayashi et al. ........ | 236/49.3 |
| 4,926,352 A | * | 5/1990 | Staffe ........................ | 701/99 |
| 5,117,643 A | * | 6/1992 | Sakurai et al. .............. | 62/133 |
| 5,118,038 A | * | 6/1992 | Shimizu et al. ............. | 237/2 A |
| 5,167,127 A | | 12/1992 | Ohtsu ......................... | 62/133 |
| 5,437,163 A | | 8/1995 | Jurewicz et al. ............. | 62/126 |
| 5,579,994 A | * | 12/1996 | Davis et al. ................ | 236/49.3 |
| 5,653,385 A | * | 8/1997 | Honda et al. ............... | 236/49.3 |
| 5,725,052 A | * | 3/1998 | Kawai et al. ............... | 165/203 |
| 5,735,338 A | | 4/1998 | Chevroulet et al. .......... | 165/42 |
| 5,761,918 A | | 6/1998 | Jackson et al. .............. | 62/181 |
| 5,775,415 A | * | 7/1998 | Yoshimi et al. ............. | 165/202 |
| 5,802,861 A | * | 9/1998 | Yamashita et al. ........... | 62/133 |
| 5,803,355 A | | 9/1998 | Ureshino et al. ............. | 236/13 |

(Continued)

FOREIGN PATENT DOCUMENTS

EP 02483802 * 12/1987

(Continued)

*Primary Examiner*—Mohammad M. Ali
(74) *Attorney, Agent, or Firm*—Westman, Champlin & Kelly, P.A.

(57) ABSTRACT

An HVAC Integrated electronic Module (HIM) (41) for controlling airflow through an HVAC module (12), the HVAC module including a variable speed blower motor (18), a plurality of airflow doors (26–28) for controlling air direction and hot-cold air temperature blend, and electrical actuators, servo motors or stepper motors for said doors, the HIM including: one or more air temperature sensors (22) for measurement of one or more of intake air temperature, outlet air temperature, air-off evaporator temperature and engine coolant temperature; actuator control circuitry (31) for controlling said electrical actuators, servo motors or stepper motors; blower motor speed control circuitry (15) for speed control of the variable speed blower motor; sensor control circuitry for said sensors; and communication circuitry for a serial communication interface (42) to enable communication with a vehicle users interface (32).

11 Claims, 3 Drawing Sheets

U.S. PATENT DOCUMENTS

| | | |
|---|---|---|
| 5,902,180 A | 5/1999 | Sunaga et al. .................. 454/69 |
| 5,908,154 A | 6/1999 | Sunaga et al. ............... 236/49.3 |
| 5,910,159 A * | 6/1999 | Matsuo et al. ................. 62/158 |
| 5,944,256 A * | 8/1999 | Arai et al. .................. 236/49.3 |
| 5,983,649 A | 11/1999 | Aislabie et al. ................ 62/133 |
| 5,988,517 A * | 11/1999 | Bauer et al. ................ 236/49.3 |
| 6,123,267 A * | 9/2000 | Baker et al. ............ 237/12.3 R |
| 6,145,330 A | 11/2000 | Goto et al. .................... 62/180 |
| 6,173,902 B1 * | 1/2001 | Bauer et al. ................ 236/49.3 |
| 6,185,484 B1 | 2/2001 | Rhinehart ....................... 701/1 |

FOREIGN PATENT DOCUMENTS

| | | |
|---|---|---|
| EP | 0 272 789 | 6/1988 |
| JP | 353021843 A * | 2/1978 |
| JP | 8-25942 A * | 1/1996 |

\* cited by examiner

HEATING/VENTILATING/AIR CONDITIONING SYSTEMS FOR VEHICLES

This Application is a Section 371 National Stage Application of International Application No. PCT/AU01/00174 filed 21 Feb. 2001 and published as WO 01/62529 on 31 Aug. 2001 in English.

This invention relates to improvements in heating/ventilation/air conditioning systems (HVAC) in vehicles, particularly motor vehicles, and relates particularly to an improved method of controlling the airflow and temperature through the HVAC module by integration of the controlling devices into a HVAC Integrated electronic Module (HIM) controlled by a serial communication bus.

Current technology in HVAC generally comprises a user interface (Climate Control) by which the driver or passenger controls the airflow, and a HVAC module which directs airflow from one or more inlet points, through heater cores and/or evaporator cores and onto a number of outlets. The Climate Control may comprise a dedicated user interface for controlling the HVAC system or it may be integrated into a Central Control and display together with other vehicle functions. The airflow through the HVAC module is generally controlled by airflow doors to open, close or blend the air through various passages through the HVAC module. Airflow doors may comprise Butterfly doors, Clamshell doors or roller vanes.

The Climate Control may connect to the HVAC module either by an electrical control system or by a mechanical linkage or a combination of both. Where the UVAC module is electrically controlled, electrical actuators, servo motors or stepper motors are used for movement of the HVAC module airflow doors. The airflow speed is generally controlled by varying the voltage across an electrical motor with airflow impeller (blower motor) by the use of electrical resistors or by a semiconductor (speed control unit). The speed control unit is controlled, in turn, by the Climate Control. In a typical HVAC module, one or more of the electrical actuators, servo motors or stepper motors may be used to control the cold to hot air temperature blend (air mix) while other electrical actuators, servo motors or stepper motors are used to control the outlet airflow directions (mode), while other electrical actuators, servo motors or stepper motors are used to control the inlet airflow direction (intake). In a typical HVAC module there will be a variety of air temperature sensors for such measurements as intake air temperature, outlet air temperature, air-off evaporator temperature and engine coolant temperature. In a typical HVAC module there will also be a variety of other electrical devices such as pressure sensors, humidity sensors, air quality sensors, air filter sensors (both pressure or infrared) and positional sensors.

While current technology is relatively sophisticated, it is still necessary to connect the HVAC module to the other vehicle systems and the Climate Control generally by employing a wiring harness for conducting electrical signals from the Climate Control to the HVAC module. Consequently, a large plurality of wires and associated connectors are required in wiring the Climate Control to the HVAC module.

Further, with current systems, different wiring harnesses are required where different HVAC module functionality or features are offered through a vehicle model range.

It is therefore desirable to provide an improved HVAC system that obviates at least some of the disadvantages of the current HVAC systems.

It is also desirable to provide an improved HVAC system that will be economical to manufacture, install, validate and service.

It is also desirable to provide an improved HVAC module that provides increased functionality and features.

It is also desirable to provide a HVAC module that can be adapted for a variety of functional needs.

It is also desirable to reduce the electrical wiring on and associated with the HVAC module and system.

In accordance with one aspect of the invention there is provided an HVAC Integrated electronic Module (HIM) for controlling airflow through an HVAC module, the HVAC module including a variable speed blower motor, a plurality of airflow doors for controlling air direction and hot-cold air temperature blend, and electrical actuators, servo motors or stepper motors for said doors, the HIM including:

one or more air temperature sensors for measurement of one or more of intake air temperature, outlet air temperature, air-off evaporator temperature and engine coolant temperature;

actuator control circuitry for controlling said electrical actuators, servo motors or stepper motors;

blower motor speed control circuitry for speed control of the variable speed blower motor;

sensor control circuitry for said sensors; and communication circuitry for a serial communication interface to enable communication with a vehicle users interface.

Preferably, the HIM also includes electrical devices for sensing humidity, air quality, air filter condition (both pressure or infrared) and position, as well as control circuitry for said electrical devices.

By redesigning the HVAC module to incorporate at least a significant portion of the control circuitry which would otherwise be incorporated in the vehicle user interface, or Climate Control, or each individual electrical device mounted to the HVAC module and by communicating using a serial communication bus, substantially reduced electrical wiring is required from the Climate Control to the HVAC module, and it is no longer necessary to have a separate HVAC module sub-wiring harness assembly connecting the actuators, blower motor speed control unit, air temperature sensors and various other electrical devices to the Climate Control.

Further, because according to this invention, at least a significant portion of the all control circuitry is now located in the Integrated HVAC electronic Module (HIM), a greater degree of testing can occur on the HVAC module prior to assembly in the vehicle and, once in the vehicle, a greater degree of testing can occur to the HVAC system prior to assembly of the instrument panel in the vehicle. Still further, with the integration of circuitry and mechanisms with the HIM a greater degree of functionality is possible such as blower speed compensation with road speed, blower speed compensation with air modes or temperature blend, blower speed compensation during changes of air modes to prevent air bursts, intake air bleed compensation for optimising HVAC system performance, ram air compensation with vehicle speed, blower speed compensation with battery voltage, compensation for non-linearity's of hot-cold temperature air mix door position versus outlet temperature, and the like.

Further, the invention control circuitry may either be implemented by application of a microprocessor based control system or discrete electronic components. In the case of a microprocessor based control system and with input of outside air temperature and sunload measurements, either discretely or on serial communication bus, the HVAC Integrated electronic Module (HIM) may also incorporate climate control circuitry implementing an Automatic Climate Control (ACC) strategy.

Further, the HVAC Integrated electronic Module (HIM) may use a shared serial communication bus with other electronic modules in the vehicle to enable shared data between said electronic modules and the HIM and also enable the HIM to have diagnostic interrogation through a single point vehicle diagnostic connection.

In order that the invention is more readily understood, an embodiment thereof will now be described with reference to the accompanying drawings therein:

Figure 1:
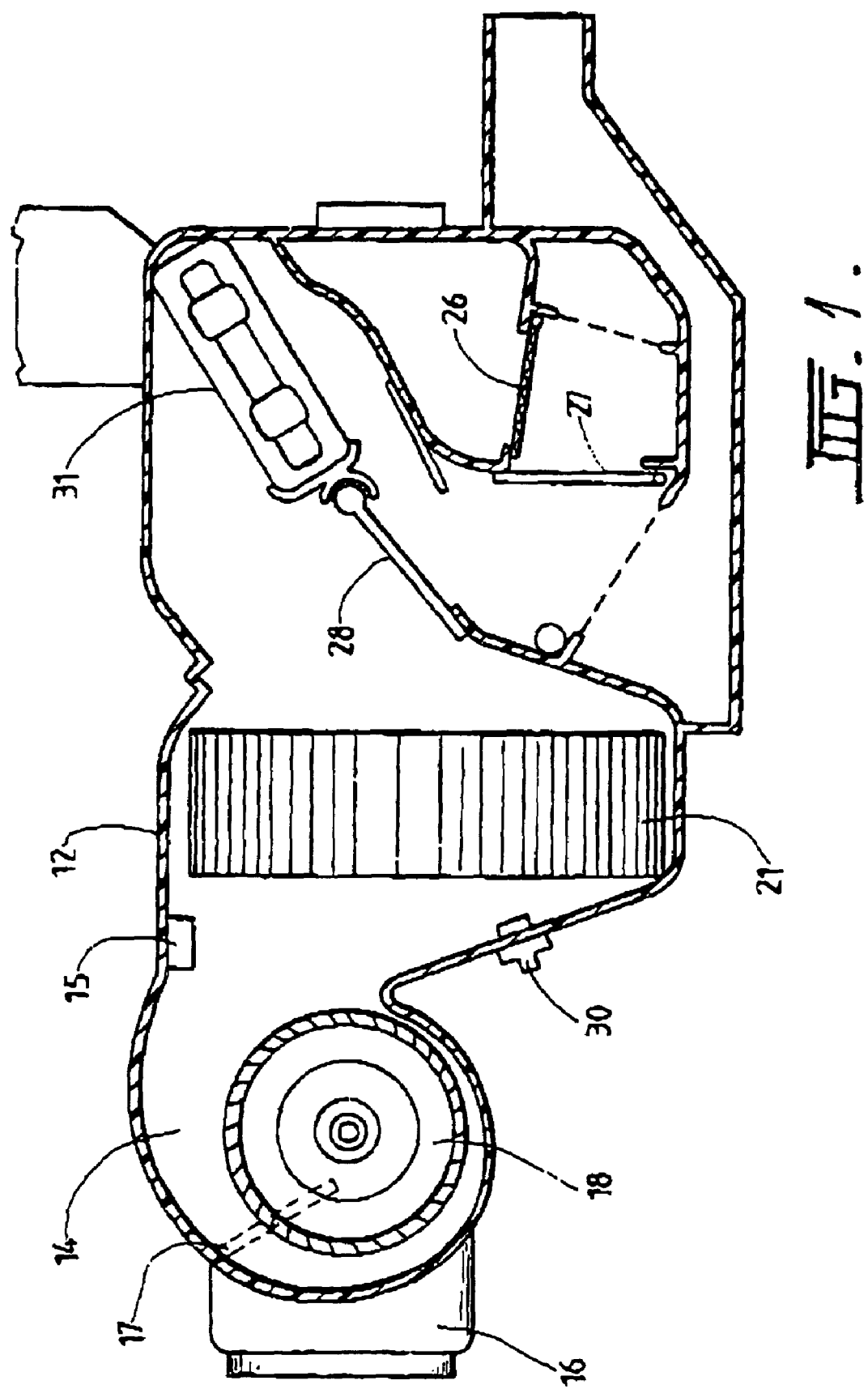
FIG. 1 is a diagrammatic view of an HVAC unit in accordance with one embodiment of the invention.

Referring to the drawings, an HVAC module comprises a mechanical system, diagrammatically shown in FIG. 1, which incorporates a plurality of doors to direct airflow from the intake to the outlets. The air intake 14 draws air from outside the vehicle cabin (fresh air) while air intake 16 draws airflow from within the vehicle cabin (recirculated air). An air intake door 17 is movable by an electrical actuator, servo motor or stepper motor (not shown) to vary the blend of fresh and recirculated air.

A blower motor 18 is used to push air through the HVAC module 12. The blower motor is controlled by a speed control unit 15 that uses airflow through the HVAC module to dissipate heat. An evaporator core 21 is used to reduce the air temperature as air flows through its fins. A heater core (not shown) is similarly used to increase air temperature as air flows through its fins. An air mix door is used to vary the blend of hot air (that which has flowed through the heater core) with cold air (that which has flowed through the evaporator core 21) and is controlled in position by an electrical actuator, servo motor or stepper motor. Various mode doors are used to direct airflow to various outlets usually comprising screen 26, face 27 and foot 28 or any combination thereof. The electrical actuators, servo motors and stepper motors for moving the doors are well known in the art and do not need to be described in detail.

Various temperature sensors, on of which is shown at 30, are used at various positions throughout the HVAC module to measure air temperatures for particular climate control strategies. Various electrical devices (not shown) such as pressure sensors, humidity sensors, air quality sensors, air filter sensors 44 (either or both pressure or infrared air filter sensors are represented by block 44 in FIG. 3) and positional sensors are also used at various locations on the HVAC module for particular climate control strategies. The use of temperature sensors, pressure sensors and other electrical devices is generally known in the art.

Figure 3:
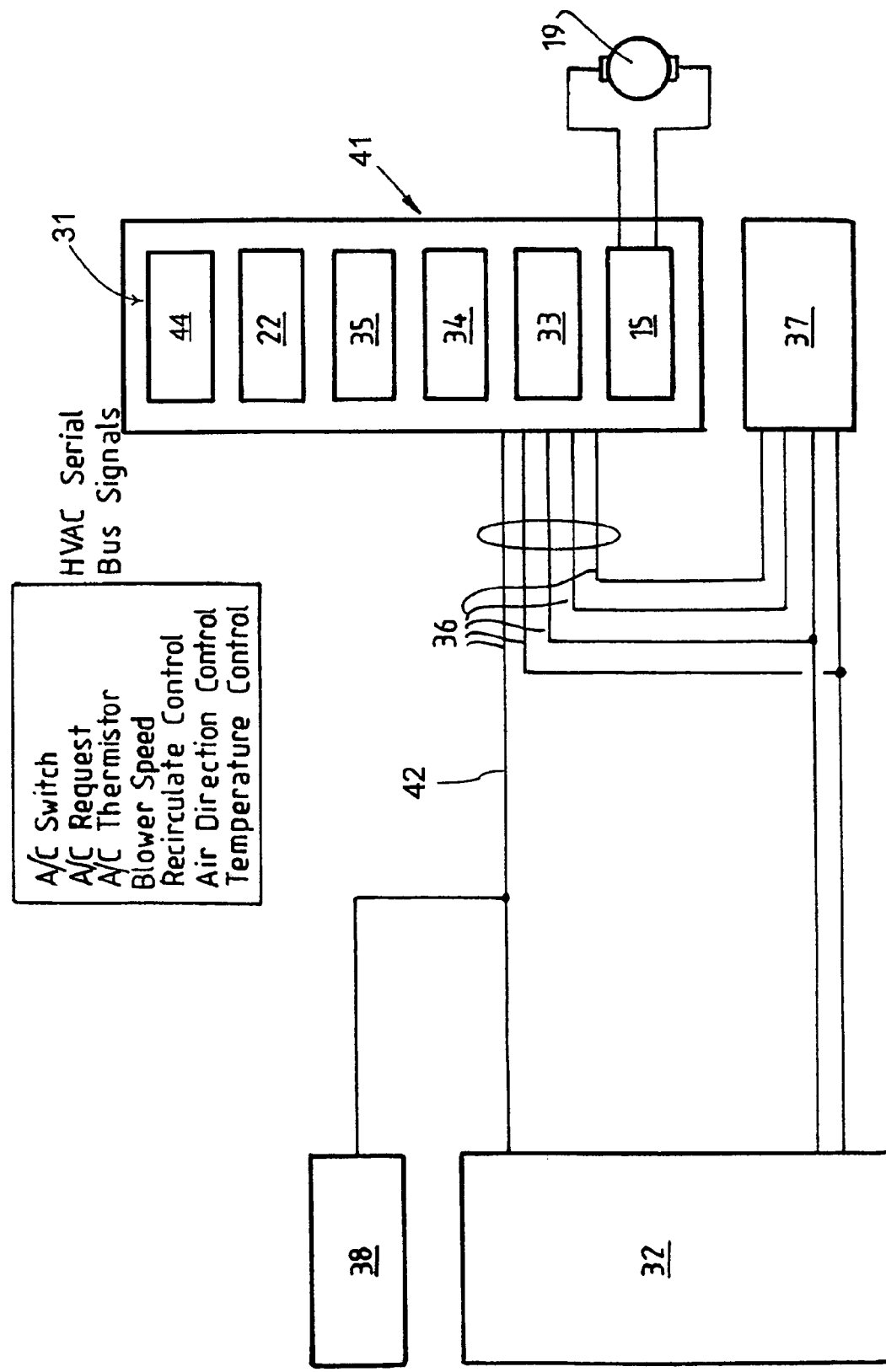
FIG. 3 is a schematic wiring diagram illustration the wiring system for an HVAC unit in accordance with the present invention.

In accordance with the present invention, some or all of these electrical or electro-mechanical devices are integrated into a single HVAC Integrated electronic Module (HIM) 41 (FIG. 3). The HVAC Integrated electronic Module (HIM) incorporates electronic control circuitry 31 for the various electrical actuators, servo motors or stepper motors, the various temperature sensors, the blower motor speed control unit and the various electrical devices such as pressure sensors, humidity sensors, air quality sensors, air filter sensors (both pressure or infrared) and positional sensors.

Figure 2:
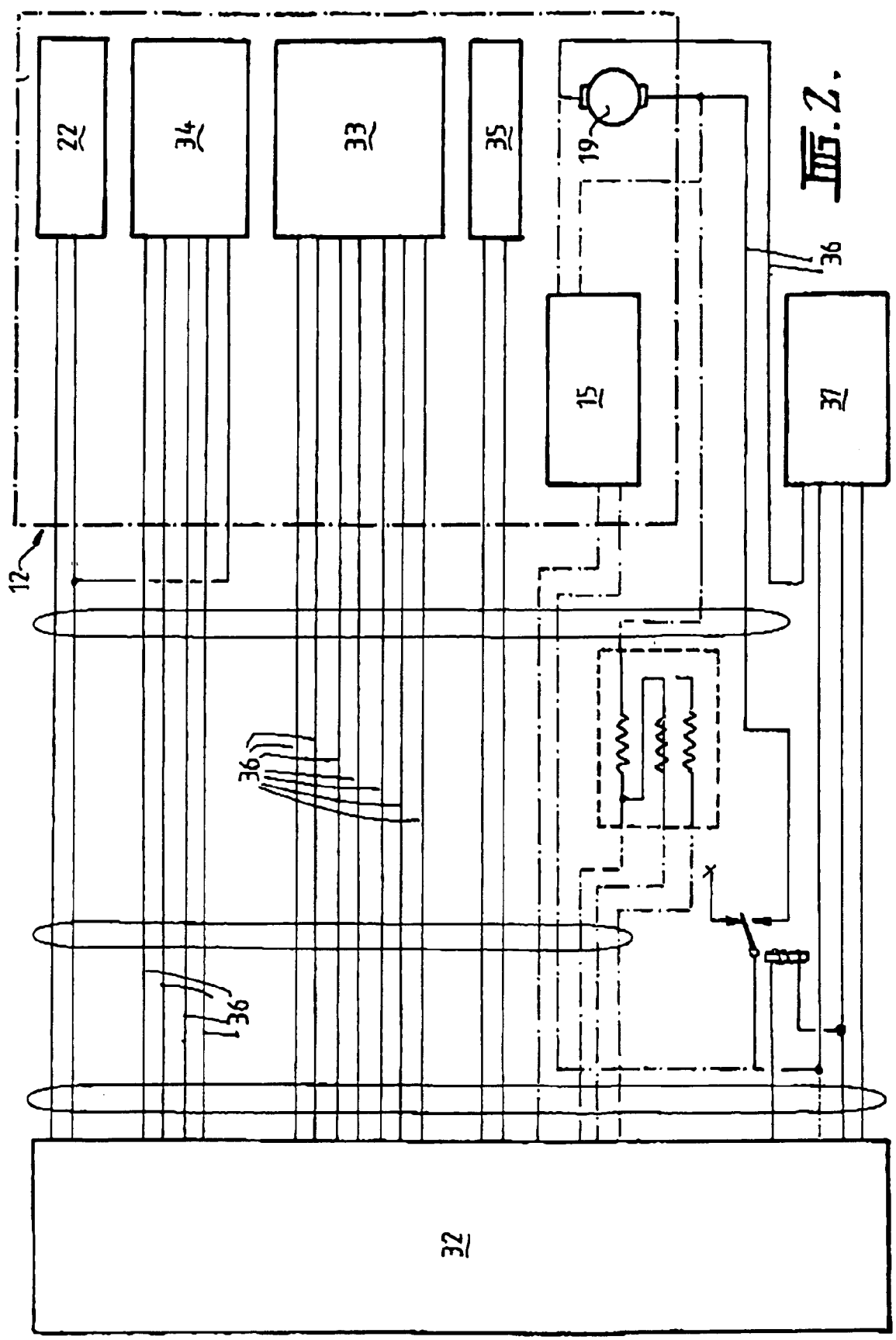
FIG. 2 is a schematic wiring diagram illustrating the wiring system of a prior art HVAC unit.

As shown in FIG. 2, in prior art HVAC module, the control of the various functions are effected from the vehicle user interface or Climate Control 32. The Climate Control 32 then controls the various electrical actuators, servo motors or stepper motors on the HVAC module 40 by means of a plurality of individual electrical wires 36 each related to a particular function, operational mode or airflow speed. Thus, the prior art HVAC module 40 illustrated has an air-off temperature sensor 22, an air mix motor 34, mode outlet motor 33, recirculate motor 35 and blower motor 19 each connected by a plurality of wires 36 to the Climate Control 32 for power supply and functional control. These electrical wires 36 include five (5) high current wires for the blower motor 19. A wiring harness and associated connectors for twenty two (22) separate wiring connections is therefore required for the HVAC module 12 to connect the module to the Climate Control 32 and the vehicle wiring system 37.

As shown in FIG. 3, in accordance with the present invention, the integration of the control circuitry 31 into the HVAC Integrated electronic Module (HIM) 41, and the use of a serial communication bus 42, reduces the number of control electrical wires 36. In the embodiment illustrated in FIG. 3, with the same components as in the prior art module, only five (5) wires are required for power and communication with the user interface or Climate Control 32, and only two (2) of these are high current wires. The HVAC serial bus signals:

A/C Switch
A/C Request
A/C Thermister
Blower Speed
Recirculate control
Air direction control
Temperature control With the system of the present invention, internal fault detection may also be achieved as a feature of the control circuitry 31. A diagnostic connector 38 may plug into the serial communication bus 42 to enable testing and diagnostic equipment to interrogate the HIM 41 module in the event of faults or reprogramming requirements. In accordance with the present invention various additional functional features can be applied to the control circuitry 31 without the need to make changes to the wiring harnesses, vehicle electrical hardware or mechanical hardware. For example, the number of operational modes may be increased or decreased or varied to provide more, less or different positions of air control doors without the need to change wiring.

Many other modifications may be made in the design and or construction of an HVAC Integrated electronic Module (HIM) in accordance with the present invention and all such modifications which come within the scope of the invention shall be deemed to be within the ambit of the above description.

What is claimed is:

1. A control module for controlling airflow through an HVAC module of a vehicle, the control module including at least the following electrical or electromechanical components, integrated into a single housing:

one or more temperature sensors for measurement of one or more of intake air temperature, outlet air temperature, air-off evaporator temperature and engine coolant temperature;

at least one electrical actuator, servo motor or stepper motor actuator control circuitry for controlling said at least one electrical actuator, servo motor or stepper motor;

blower motor speed control circuitry for speed control of the variable speed blower motor of the HVAC module;

sensor control circuitry for said sensors; and communication circuitry for a serial communication interface to enable communication with a vehicle users interface.

2. The control module according to claim 1, and further including:
one or more electrical devices for sensing one or more of pressure, humidity, air quality, air filter condition and position; and
electrical device control circuitry for said electrical sensing devices.

3. The control module according to claim 2, wherein said one or more electrical devices for sensing air filter condition use either or both of infra-red or pressure sensing.

4. The control module according to claim 1, wherein the control circuitry is implemented by application of a microprocessor based control system.

5. The control module according to claim 4, and further including climate control circuitry implementing an Automatic Climate Control (ACC) strategy based upon measurement of outside air temperature and sun-load measurements, either discretely or on said serial communication interface.

6. The control module according to claim 1, wherein the control circuitry is implemented by application of discrete electronic components.

7. The control module according to claim 1, wherein the serial communication interface is adapted to be shared with other electronic modules in the vehicle to enable data to be shared between said other electronic modules and the HIM and also enable diagnostic interrogation to be performed on the HIM through a single point vehicle diagnostic connection.

8. The control module of claim 1, wherein electrical connections between said components are independent of an electrical wiring system of a vehicle too which the control module is to be fitted.

9. The control module of claim 8, wherein electrical connections between said components form part of the control module.

10. The control module of claim 9, wherein electrical connections between said components include one or more of the following electrical connection means; a printed circuit board, a dedicated wiring harness.

11. A control module for controlling airflow through an HVAC module of a vehicle, said control module including at least the following electrical or electromechanical components mechanically integrated into a single housing:
one or more temperature sensors for measurement of one or more of intake air temperature, outlet air temperature, air-off evaporator temperature, air-off evaporator temperature and engine coolant temperature;
actuator control circuitry for controlling said at least one electrical actuator, servo motor or stepper motor of the HVAC module;
blower motor speed control circuitry for speed control of a variable speed blower motor of the HVAC module;
sensor control circuitry for a serial communication interface to enable communication with a vehicle users interface.

* * * * *